United States Patent Office 3,413,633
Patented Nov. 26, 1968

3,413,633
METHOD AND APPARATUS FOR THE RADIO-ELECTRIC EXPLORATION OF SPACE
Gerard J. Lehmann, Paris, France, assignor to Compagnie Generale d'Electricite, Paris, France
Filed Dec. 30, 1966, Ser. No. 606,165
Claims priority, application France, Dec. 30, 1965, 44,390
6 Claims. (Cl. 343—10)

ABSTRACT OF THE DISCLOSURE

A system for exploration of space by means of waves in which the space is divided into sections or slices and is swept by a beam of sustained electromagnetic waves, the same section being swept by a directional receiver angularly displaced with respect to the transmitter.

Background of the invention

The present invention has as its object a radioelectric device for the exploration of space, that is, for the detection of celestial bodies or objects whose movement is effectuated according to a known law, and in particular detection of artificial satellites and of assimilated bodies such as debris of satellites or rockets.

Several hundreds of artificial celestial objects exist at present in orbit: satellites, debris of satellites, debris of rockets. This number varies incessantly by reason of the fact of the disappearance of certain ones among them, on the one hand, and of the new launchings, on the other; the result is that on the whole this number tends to increase. For multiple reasons, scientific and others, it is advantageous to keep an up to date inventory, within predetermined geographic zone, of the artificial celestial objects passing above this zone between two altitude limit values, for example, above 50 km. (to eliminate consideration of airplanes) up to 7000 to 8000 km.

The application of radioelectric processes to such a surveillance of space offers solutions to this problem. In an analogous order of ideas, the radar operating either as pulsed-radar or with continuous waves, makes it possible to detect and locate targets, either fixed or mobile, for the applications to maritime or aerial navigation or to the detection of a possible aggressor.

According to a first known type of apparatus, a continuous wave emitted by a transmitter, carried by an object to be detected or to be located, is received on an interferometric device constituted by at least two groups of two antennae each. One deduces from the phase shift between the currents received by the two antennae of a group the angle which the transmission path makes with respect to the vertical axis of the antenna group as projected on the vertical plane through the axis of two antennae. One utilizes two groups of antennae, one oriented preferably in the direction north-south and the other in the direction east-west, the resultant of the two projections locating the line to the target. A high precision in the measurement of the angles is assured by a distance of several wave-lengths between the antennae of a group, however, there results therefrom a doubt as to the quadrant in which is located the determined sight angle. This doubt is resolved by recourse to an auxiliary group of antennae closer to each other. The lobes of the antennae have a width of several degrees which makes it possible that a satellite may be followed by the measuring device during a relatively long period of time, of several minutes.

Another system, based on the same measuring principle, operates with slave antennae and an active responder aboard. This system comprises three stations, a principal transmission-reception station, which makes pursuit, that is, the enslavement of the pointing direction of one antenna to the direction of the target, and two slave receiver stations whose antennae are enslaved by the principal station. One can effect a triangulation of the target by means of the directions of the three receiver antennae.

In another system providing operation by reflection of a continuous wave emitted by a transmitter on the ground, one utilizes an assembly of antennae having a very slight aperture in the plane north-south (0.3°) and a large aperture in the plane east-west. One determines a target at the moment of its passage across the plane east-west thus defined.

Summary of the invention

The aim of the present invention is to perform a radioelectric exploration of space utilizing continuous waves by conducting the exploration in sections or regions having a predetermined thickness and a general curvature that may be varied at will, whereby such space sections may be, for example, spherical, planor, etc.

The advantage of such a system is to effect rapidly a sweep of the entire zone to be explored.

The possibility of varying the thickness and the form of the layer to be explored permits an optimum adaption to all the exploration conditions which are apt to present themselves.

According to the present invention, a radioelectric exploration device comprises a ground transmitter of sustained or continuous waves, a ground receiver, a transmitting antenna providing a conical beam associated with sweep means for sweeping the beam to permit coverage of an entire hemisphere, a receiving antenna, having preferably a receiving pattern identical to the pattern of the said transmitter antenna, associated with sweep means presenting a predetermined angular shift with respect to the transmitter antenna, as a function of the altitude of the layer which one seeks to explore.

These and further objects, features and advantages of the present invention will become more obvious from the following description when taken in connection with the accompanying drawings which show, for purposes of illustration only, several embodiments according to the present invention, and wherein.

Figure 1:
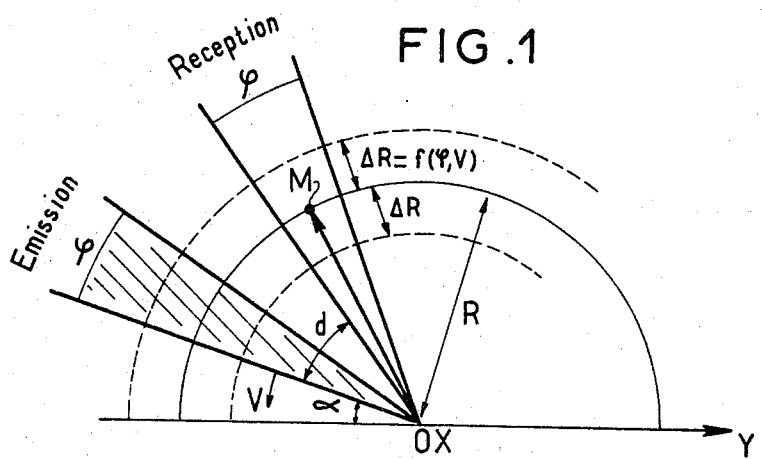
FIGURE 1 is a schematic representation of the system in accordance with the present invention.

The principle of operation of the device according to the present invention is the following:

The transmitter antenna sweeps the space with a uniform movement whereas the receiver antenna is angularly shifted with respect to the transmitter antenna by an angle $d$ which may be variable in the general case but which, at first, may be assumed to be fixed. At a given instant, a target M placed at a distance R from the station is illuminated by the transmitter antenna. The illumination duration $\delta t$ is obviously proportional to the aperture (angle) of the transmitter antenna and inversely proportional to the sweep velocity V of this antenna (see FIGURE 1).

The wave reflected by the target comes back to the station on the ground at a time $t'=t+\Delta t$. For a range $R$ and a speed of propagation $c$, one has the relation $\Delta t = 2R/c$. At the end of this time $\Delta t$, the receiver antenna has caught up with its angular shift $d$ on the transmitter antenna. One has therefore $d = V\Delta t = V2R/c$. The reflected signal, which is received, will have a maximum energy if at the instant $t$ the receiver antenna is directed in its turn toward the target and if, moreover, the parameters are regulated in such a fashion that the duration of reception is equal to $\delta t$. One assumes that $\varphi$ is the aperture of the two antennae, assumed to be identical, in degrees and V is the sweep velocity, in degrees per second.

Since the time of establishment of the currents in the receiver are, as is well known, approximately equal to the inverse of the band pass, there exists necessarily a correlation between the sweep velocity and the band pass B of the receiver.

One may postulate $V = k\varphi$, or $1/k = \varphi/V$; $1/k$ being the time during which the target, assumed to be immovable during the duration of the passage of the beam, is illuminated by the beam. The factor $k$ has the dimension of the inverse of time, either a frequency or frequency band. The band pass of the receiver being equal to B, it is necessary that the duration of the signal received be at least equal to $1/B$ or $1/k \geq 1/B$ or $B \geq k$.

To facilitate the discussion, one assumes $B = nk$, with $n \geq 1$.

With these conventions, the sweep velocity is given by $$V = \frac{B}{n}\varphi$$

$$d = \frac{B}{n} \cdot \varphi \cdot \frac{2R}{c}$$

Therefore, any target located at a distance R will furnish to the receiver system a signal whose duration will have a maximum possible value $n/B$.

The distance R, the so-called reference range, depends exclusively on the angular shift $d$.

Figure 2:
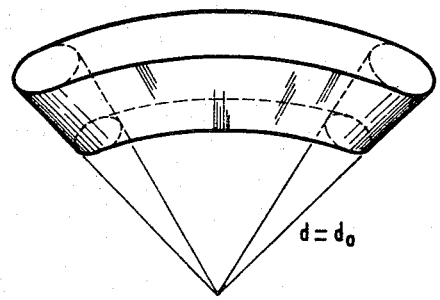
FIGURES 2, 3 and 4 illustrate examples of selective exploration of space with various patterns which are possible with a system according to the present invention.

According to a first characteristic of the invention, one sweeps the space in spherical sections by giving $d$ a constant value during a sweep (FIGURE 2).

Figure 3:
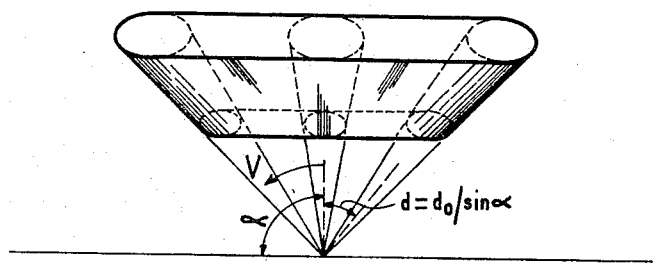

According to another characteristic, one sweeps the space in sections of a shape predetermined beforehand by causing $d$ to follow, by a program means, a predetermined law of variation as a function of the instantaneous pointing angle or sight angle. FIGURE 3 illustrates the case where the angular shift follows a law or type $d = do/\sin \alpha$, $\alpha$ being the sight angle. One obtains then the exploration in a plane layer.

The detection according to the present invention furnishes a signal of maximum energy, of duration $\delta t$ for the reference range, but it also furnishes other signals, shorter than $\delta t$, but still utilizable on both sides of the reference range. One considers a theoretical maximum section thickness $e_0$, limited on both sides of the reference range by the ranges $(R+\Delta R, R-\Delta R)$ for which the received signal has just a zero duration.

Such a zero duration is obtained obviously for a differential time of propagation, more or less, $$\frac{2\Delta R}{c} = \frac{n}{B}$$

The theoretical maximum thickness $e_0$, between a signal of zero duration on the upper limit and a signal of zero duration on the lower limit, is equal to $2\Delta R$; one has therefore $e_0 = cn/B$.

In fact, the real thickness $e$ must be practically limited to the ranges for which the duration of the signal received is greater or equal to $1/B$.

One has therefore $$\frac{e}{c} = \frac{1}{k} - \frac{1}{B}$$

or $$e = \frac{c}{B} \cdot (n-1)$$

According to a known formula of spherical trigonometry, the solid angle cut into a sphere by a cone of aperture $\varphi$ has for its value $2\pi(1 - \cos \varphi/2)$ steradians. The number of discrete positions existing therefore over a hemisphere is equal to $$N = \frac{2\pi}{2\pi(1-\cos \varphi/2)}$$

discrete positions. If, as in the present case, the angle $\varphi$ is small, one may replace $\cos \varphi/2$ by the two first terms of the development. It follows therefore $$N = \frac{8}{\varphi^2}$$

for $\varphi$ in radians. For $\varphi$ in degrees one has $$N = \frac{26000}{\varphi^2}$$

approximately.

The time $\delta t$ during which the antenna illuminates a position is, as has been seen above, equal to $1/k$. Therefore, the time T necessary to sweep a layer in hemispherical exploration (or to sweep a hemispherical layer in the particular important case of a constant range R during an exploration) is equal to $$T = \frac{26000}{\varphi^2 k} = \frac{26000n}{\varphi^2 B}$$

The equations which control the device of the present invention are therefore the following:

Sweep velocity $$V = \frac{B}{n} \text{ with } n \geq 1 \qquad (1)$$

Angular shift between antennae $$d = \frac{B}{n}\varphi \frac{2R}{c} = \frac{RV}{c} \qquad (2)$$

Theoretical maximum thickness over an explored layer $$e_0 = \frac{c}{B}n \qquad (3)$$

Maximum practical thickness $$e = \frac{c}{B}(n-1) = \left(\frac{\varphi}{V} - \frac{1}{B}\right) \qquad (4)$$

Sweep time of one layer $$T = \frac{26000n}{B\varphi^2} \qquad (5)$$

One must also add the equation of the radar which defines the maximum theoretical range $$\varphi^4 \cdot B = \frac{A}{R_0^4} \qquad (6)$$

where A is a constant encompassing various parameters of the installation, and of the target (transmission power, noise temperature of the receiver, equivalent surface of the target, etc.).

An exploration device constructed according to the preceding indications presents over the known systems the advantage of effectuating the exploration of a given zone of space within the shortest possible time. In effect, an exploration system with coinciding antennae or with parallel antennae, pointed in a given direction, must rest or remain stationary in this direction during the entire time which separates the emission of a pulse from the return of its echo on the most remote possible target. If the target is an artificial satellite, which may be located, for example, at 15,000 km., the duration of rest must be 0.1 sec. which limits considerably the exploration speed.

In the application to celestial objects other than artificial satellites, revolving at distances which are considerably greater, the duration of rest or stationary condition of the antennae of such a system is still longer and the resulting exploration velocity is still smaller.

In contradistinction thereto, in the system according to the present invention, it is possible to give to the band pass B of the receiver a minimum tolerable value by reason of the velocity of variation of the received frequency $f_D$ coming from the target. This frequency $f_D$ is equal to the emission frequency modified by the Doppler effect. The theoretical study demonstrates that the band pass B must be equal to $\sqrt{df_D/dt}$, that is to the square root of the velocity variation of the frequency modified by the Doppler effect. This value is known in its average for a given space layer. An appropriate filter gives to the receiver the desired band pass; this filter is selected from an assembly of filters corresponding to the different conditions of use.

By choosing the other parameters in accordance with Equations 1 to 5 one is certain to constitute a system having an exploration velocity as great as possible.

As an example of realization applicable to artificial celestial satellites, one may take the following numerical values:

The sweep is effected in 2 layers, a low layer with a thickness of 1000 km. and a high layer with a thickness of 4000 km. One fixes at approximately 30 seconds the duration T of a sweep of the entire hemisphere.

For the lower layer one takes for the band pass $B=15$ Hz. This value is the minimum tolerable value defined above.

According to Equation 4, one has $n=1.05$.

According to the Equation 5 with $T=30$ sec., the value of $\varphi$ becomes $\varphi=7.8°$. The sweep velocity, according to Equation 1, will be exactly $V=112°/s$.

For the upper layer, maintaining the same band pass $B=15$ Hz., with $n=1.2$ one obtains $T=34$ sec. The sweep velocity for this layer is therefore $98°/s$.

It is possible to construct a transmitter, a receiver, and antennae corresponding to these conditons. The transmitter could have a power of the order of 500 kw. and a frequency near 100 mHz. The receiver, having a noise factor of 4–5 db, may be equiped with an assembly of filters each having a band pass of 15 Hz., the assembly covering a band of ±15 kHz. on both sides of the transmitter frequency, that is a total number of 2000 filters. With a target having an equivalent surface of the order of 1 m.², the maximum range would be from 9,000 to 10,000 km.

Figure 5:
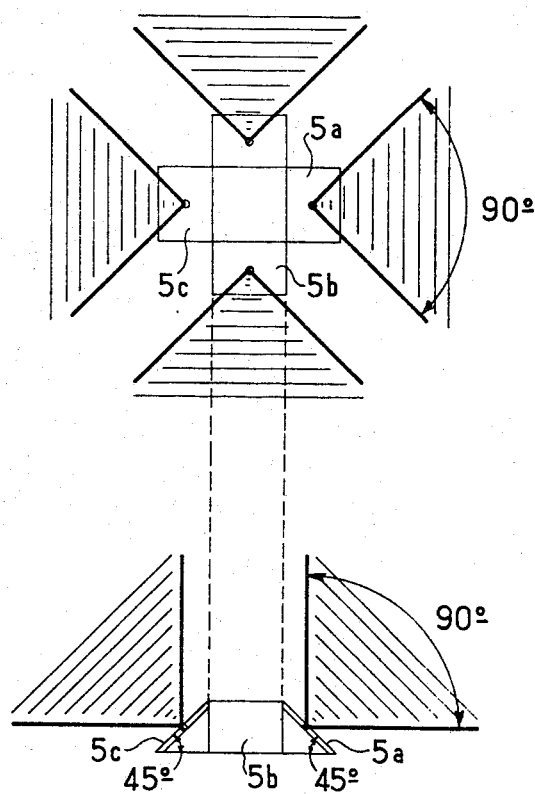
FIGURE 5 is a schematic view, both in plan and in elevation, of one antenna type which can be used with the present invention.

The antennae may be plane square screens having, for example, 30 m. length on each side. Since the rocking or pivoting of the diagram of an antenna does not exceed practically 110°, each antenna may be constituted by the association of four partial antennae inclined at 45° to the horizontal, and facing, respectively, in four directions at 90° with respect to one another: the diagram of each antenna will then pivot through 90° only. This has been schematically indicated in FIGURE 5.

The pivotal movements will be obtained, as is well known, by means of conventional phase shifters, which may have the form of delay lines with taps. Phase shifters including a winding over a ferrite bar have been described in particular in the article "Phased arrays" which appeared in the publication "Microwave Journal" of June 1965.

Figure 6:
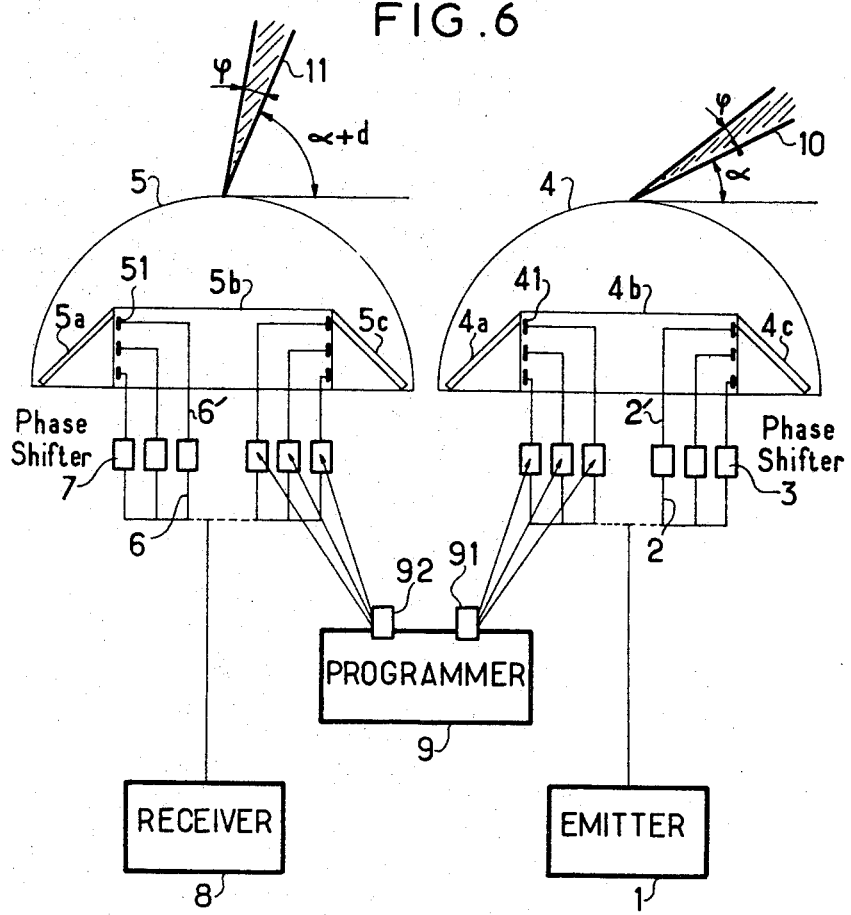
FIGURE 6 is a schematic block diagram of one installation according to the present invention.

FIGURE 6 illustrates in schematic form a preferred embodiment of a device for carrying out the present invention.

A transmitter antenna is schematically indicated by reference numeral 4 and comprises for example, four plane screens such as 4a, 4b and 4c (the fourth not being visible in this figure) inclined with respect to the horizontal and constituted by an assembly of radiating elements such as 41. These elements are fed in sustained or continuous waves from a transmitter 1 by way of individual lines such as 2, 2' each including a phase shifter 3.

The block 5 represents, in a similar fashion, a receiver antenna, in principle identical to the transmitter antenna, The currents received by each radiating element such as 51 are conducted by way of lines such as 6, 6', provided with phase shifters such as 7, and are added at the input of the receiver 8.

A programming device 9 controls from a first group of outputs 91 the phase shifters 3 of the transmission antenna 4 in such a manner as to furnish a beam 10, of aperture $\varphi$ which is displaced with an angular velocity $V°/s$ and which has, at a considered instant a sight angle of $\alpha$.

The same programming device 9 controls from a second group of outputs 92, the phase shifters 7 of the receiver antenna 5 in such a manner as to obtain a receiving beam 11 having preferably the same aperture displaced at the same velocity $V°/s$ and having at the instant $t$ a sight angle of $\alpha+d$.

By regulating the programming device 9, one may give a predetermined shape to the layer to be explored. For example, for $d=$constant, the explored layer will have a spherical form. By taking $d=d_0/\sin \alpha$, one will give to the explored layer a form of a plane pancake.

Figure 4:
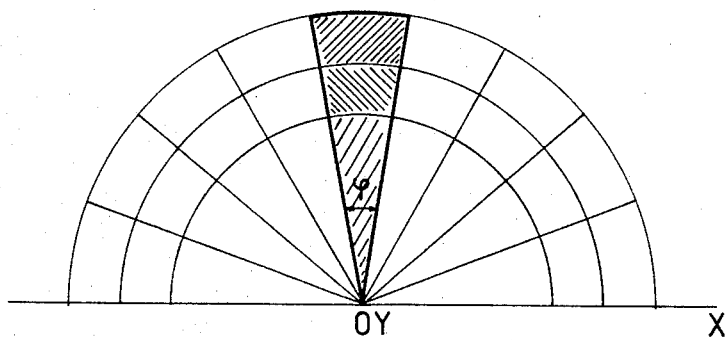

Several modes may be adopted for the sweep. In general, one will cause the beams of the antenna to pass through a fan contained in a plane MOY (FIGURE 1, the beams pivot about OX), then this plane pivots about the horizontal axis OY with a fixed angle $\varphi$ equal to the aperture of the beam between a fan-shaped sweep and the following fan-shaped sweep (FIGURE 4).

While I have shown and described one embodiment in accordance with the present invention, it is understood that the same is not limited thereto but is susceptible of numerous changes and modifications as known to a person skilled in the art and I therefore do not wish to be limited to the details shown and described herein but intend to cover all such changes and modifications as are accomplished by the scope of the appended claims.

I claim:

1. A device for the exploration of space by high frequency electromagnetic waves, comprising:

transmitter means generating a conical beam of electromagnetic waves including first sweep means for sweeping at a predetermined angular velocity a portion of space by said conical beam of electromagnetic waves, direction receiver means for receiving electromagnetic waves, having a receiving pattern substantially identical to the pattern of said transmitter means and including second sweep means for sweeping said portion of space to detect the electromagnetic waves transmitted by said transmitter means and reflected by an obstacle, and control means operatively connected to said first and second sweep means to control the movement of the receiving pattern of said receiver means with respect to the movement of the conical beam of said transmitter means, said control means being capable of causing the sweep of a point in space by the receiver means with a predetermined delay $d$ over the sweep of said point by the transmitter means, said control means varying said predetermined delay $d$ such that $d=d_0/\sin \alpha$, $d_0$ being a constant, $\alpha$ being the instantaneous sight angle of said receiver beam.

2. A device according to claim 1 wherein said control means includes programming means for controlling said first and second sweep means to sweep a region in space along a first direction and to successively sweep adjacent regions by indexing said sweeping along a second direction transverse to said first direction at the end of each sweep.

3. A device according to claim 2 wherein said beam and receiving patterns are indexed by said programming means at the end of each sweep by an amount of the order of the angular aperture of said beam and receiving patterns.

4. A device according to claim 1, in which said first and second sweep means include controllable phase shifter means and said transmitter means is formed by a plurality of dipole radiating elements substantially disposed in at least one fixed plane, said dipole elements being connected to a source of high frequency voltage by way of said controllable phase shifter means, respectively, the angular movement of said beam being obtained by the control of said phase shifter means.

5. A device according to claim 4, wherein said receiver means is formed by a plurality of dipole receiver elements disposed substantially in at least one fixed plane, said dipoles being operatively connected to a receiver device by way of controllable phase shifter means, respectively, the angular movement of the direction of reception being obtained by the control of said phase shifter means.

6. A device according to claim 5, in which said control means comprises exploration programming means including a first plurality of output terminals connected respectively to the phase shifter means of said transmitter means to control the angular movement of said beam of electromagnetic waves, and a second plurality of output terminals operatively connected, respectively, to the phase shifter means of said receiver means to control the angular movement of the axis of the receiving pattern of said receiver means with a predetermined shift with respect to the axis of the beam of said transmitter means.

References Cited

UNITED STATES PATENTS 2,399,017   4/1946   Goldman _____ 343—10 X

RICHARD A. FARLEY, *Primary Examiner.*

T. H. TUBBESING, *Assistant Examiner.*